United States Patent
Tooker et al.

(10) Patent No.: US 6,446,079 B2
(45) Date of Patent: *Sep. 3, 2002

(54) NETWORK MANAGEMENT PROTOCOL FOR EFFICIENT RETRIEVAL OPERATIONS

(75) Inventors: Mark Tooker; Jonathan Bosloy; John Burns, all of Kanata; Robert Muller, Ottawa, all of (CA)

(73) Assignee: Alcatel Networks Corporation, Kanata (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,684

(22) Filed: Mar. 13, 1998

(51) Int. Cl.[7] ................................................ G06F 11/00
(52) U.S. Cl. ....................... 707/104; 707/100; 707/101; 707/3
(58) Field of Search .................... 707/104, 100, 707/101, 3; 709/221, 202, 250; 345/352; 370/218

(56) References Cited

U.S. PATENT DOCUMENTS

| | | | | |
|---|---|---|---|---|
| 5,367,635 A | * | 11/1994 | Bauer et al. ............... | 709/221 |
| 5,539,870 A | * | 7/1996 | Conrad et al. .............. | 345/352 |
| 5,561,769 A | * | 10/1996 | Kumar et al. ............... | 709/202 |
| 5,659,736 A | * | 8/1997 | Hasegawa et al. ........... | 707/100 |
| 5,706,508 A | * | 1/1998 | Chen et al. ................. | 707/200 |
| 5,920,867 A | * | 7/1999 | Van Huben et al. ......... | 707/101 |

* cited by examiner

Primary Examiner—Paul R. Lintz
Assistant Examiner—Sanjiv Shah
(74) Attorney, Agent, or Firm—Larson & Taylor, PLC

(57) ABSTRACT

A network management protocol for the efficient retrieval of items of information or objects from managed elements or other network management systems in a digital communications network is described. The new protocol introduces one or more qualifier bits appended to an information retrieval command wherein the qualifier bit specifies the subclasses of the objects requested.

27 Claims, 5 Drawing Sheets

| ID | TYPE | ENDPOINT 1 PORT/VPI/VCI | ENDPOINT 2 PORT/VPI/VCI |
|---|---|---|---|
| 1 | SVCC | A/1/1 | B/4/2 |
| 2 | PVCC | A/2/1 | B/1/1 |
| 3 | SPVCC | A/3/1 | C/4/0 |
| 4 | SVCC | B/4/3 | C/18/0 |
| 5 | PVCC | B/4/4 | C/20/4 |
| 6 | SPVCC | B/4/5 | C/15/0 |

FIG. 3

| ID | TYPE | ENDPOINT 1 PORT/VPI/VCI | ENDPOINT 2 PORT/VPI/VCI |
|---|---|---|---|
| 1 | SVCC | A/1/1 | B/4/2 |
| 3 | SPVCC | A/3/1 | C/4/0 |
| 4 | SVCC | B/4/3 | C/18/0 |
| 6 | SPVCC | B/4/5 | C/15/0 |

FIG. 4

NETWORK MANAGEMENT PROTOCOL FOR EFFICIENT RETRIEVAL OPERATIONS

FIELD OF THE INVENTION

This invention relates to communications network management systems and more particularly to a protocol for improving the retrieval of specified items of information from network management systems and managed elements.

BACKGROUND

Protocols used by communications Network Management Systems (NMSs) for retrieving information from managed elements (MEs) or other NMSs commonly define a "getnext" operation. The getnext operation is used in order to retrieve one or more items of information (called objects), when the NMS does not know beforehand how many objects exist, or even if any objects exist. The NMS typically sends repeated getnext commands to retrieve all objects contained in a series (such as all rows in a logical table), starting at the beginning of the series and continuing until either no more reply is received to the getnext command, or else a reply is received containing an object which lies outside of the desired series.

Similarly, a "getbulk" command is typically defined, which allows an NMS to simultaneously retrieve all items in a series, by specifying (a) the object at the start of the desired series, and (b) the maximum number of successive objects to be retrieved.

The shortcoming of these approaches occurs when the same objects may be viewed as belonging to different series simultaneously. For example, a ME that is a packet switching device may have a table of cross connection objects. Within the table, there are types of cross connections, such as Permanent Virtual Circuits (PVCs), Switched Virtual Circuits (SVCs), and Soft Permanent Virtual Circuits (SPVCs). For the purposes of accounting for total utilization of the ME, the NMS may wish to retrieve information on all cross connections on the ME, regardless of type. For the purposes of allowing a user of the NMS to view and manage only particular types of cross connections (for example, only PVCs and SPVCs), the NMS may wish to retrieve information on these types but not on any other.

PRIOR ART

There are two prior art solutions to the problem of retrieving only selected objects from a series.

In the first prior art solution, the NMS retrieves all items in the series, and discards all those of a type which is not desired, before processing the information further. This has the major shortcoming that it is inefficient, from the point of view of:

a) processing resources on the ME (to copy information on each object into the "get" reply);
b) processing resources on the NMS (to retrieve and examine each object from the reply); and
c) the amount of bandwidth utilized for communications between the ME and the NMS.

In the second prior art solution, different logical series of data are defined on the ME for the same information. For example, cross connections on a packet switch can be retrieved from an "all cross connections" table, from a "PVC" table, from a "SVC" table, etc. The same objects would be accessible from different tables, depending on their type and the definition of the table. The NMS can therefore select whichever table is desired, to fulfill a particular management request. The shortcoming of this approach is that it is inflexible. The NMS cannot make "ad hoc" queries, that are for new or different types or combinations of types of objects within a series, unless the providers of the NMS and ME have previously agreed upon all types of series that will be supported.

SUMMARY OF THE INVENTION

It is an object of the present invention to provide an improved protocol for network management systems to retrieve objects from managed elements within the network or from other network managers.

Therefore in accordance with the present invention there is provided in a communications network management system in which items of information respecting managed elements within the network are retained within the managed elements, a protocol for improving retrieval of information from the managed elements, the improvement comprising adding one or more qualifiers to the items of information wherein the qualifiers represent subclasses of the information.

BRIEF DESCRIPTION OF THE DRAWINGS

The invention will now be described in greater detail with reference to the attached drawings wherein:

FIG. 3 shows an example table of VCC cross connection objects relating to the various types of connections, which would be contained within a database of managed objects maintained by the ATM switch illustrated in FIG. 1;

FIG. 4 shows a table of cross connection objects, derived from the table in FIG. 3, as the table would appear at the NMS having been received from the ME in response to the protocol of the present invention;

DETAILED DESCRIPTION OF THE INVENTION

The basis of this invention is a protocol together with corresponding functionality effected at a network management system (NMS) and a managed element (ME) within a communications network, whereby the NMS can flexibly define which subclasses of objects it wishes to retrieve from a given series of objects at the ME. This is accomplished through the use of one or more extra qualifiers, for example, appended to the well-known getnext or getbulk commands which the NMS sends to the ME or another NMS. The qualifiers specify which subclasses of objects are to be retrieved from the series.

An example of such a qualifier would be a bitmap field, in which a 1 (one) or a 0 (zero) in an agreed-upon bit position specifies whether objects of a particular type should be retrieved from the series. In this way, the NMS can specify any number of types of object to retrieve, by setting one or more bits in the qualifier.

Figure 1:
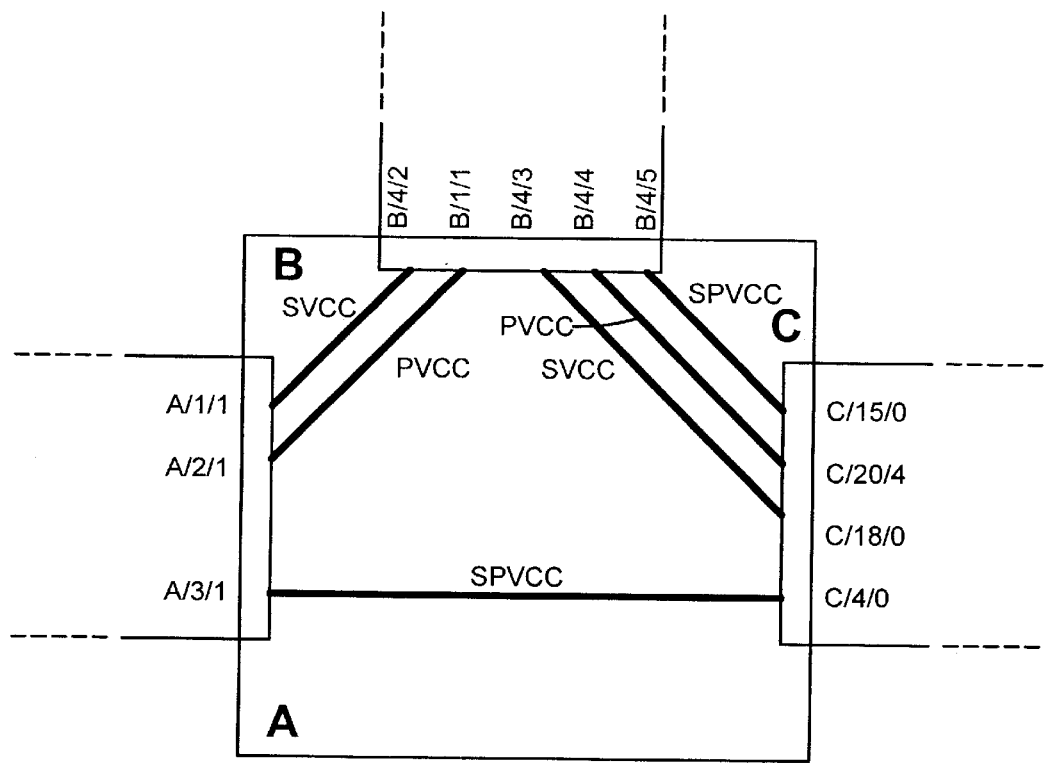
FIG. 1 shows an asynchronous transfer mode (ATM) switching system containing several virtual channel circuit (VCC) cross connections between external communications interfaces.

The getnext and getbulk requests including the qualifier, in accordance with the invention, may be advantageously used within the context of an ATM communications network by the NMS to retrieve cross connection and external interface (e.g. port) information from respective ATM switching systems. For example, FIG. 1 illustrates an ATM switch containing several virtual channel circuit (VCC) cross connections between external communications interfaces. Should the NMS wish to retrieve information on only permanent virtual channel circuit (PVCC) cross connections, it might do so by setting only the first bit of the qualifier of the bitmap when sending getnext or getbulk requests to the ATM switch. Similarly if the NMS wishes to retrieve information on the permanent, switched, or semi-permanent virtual channel circuit (PVCC, SVCC or SPVCC) cross connections, it could do so by setting the first, second, and third bits, respectively, in the qualifier to a 1 (one).

A particular implementation of this invention may be based upon the well known Simple Network Management Protocol (SNMP). A bitmapped qualifier field could be incorporated into an SNMP management information base (MIB) object identifier (OID) as one of the fields in a table identifier. For example, the following OID could specify the top of a table containing cross connection information:

30 1.3.6.1.2.1.10

Without this invention, the NMS to retrieve individual rows of information from the table using getnext requests would send the first request containing an OID as follows:

1.3.6.1.2.1.10.0

The final field in the OID, "0", specifies that the first row in the table should be retrieved. The NMS would have to send the request, examine the reply to see if the type of row retrieved is of the desired type, and if not, send another getnext request using the OID of the previously retrieved row as the OID specified in the getnext request, sending the second getnext request and repeating the process until a row of the desired type is retrieved.

Using this invention, the NMS could insert a qualifier field as the second last field in the OID specified in the getnext request, as follows:

1.3.6.1.2.1.10.<qualifier>.0

Using an OID in this way specifies to the managed element that the first row in the table identified by the OID "1.3.6.1.2.1.10" whose type matches one of the types specified in the <qualifier> field should be retrieved.

Figure 2A:
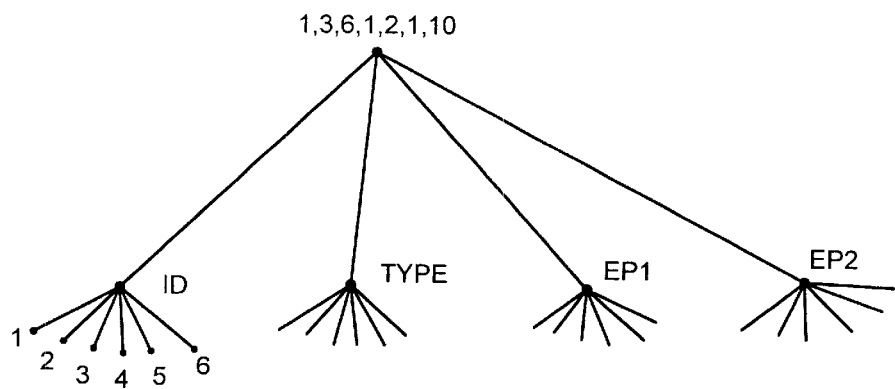
FIGS. 2A and 2B illustrate a Simple Network Manager Protocol (SNMP) management information base (MIB) tree.
Figure 2B:
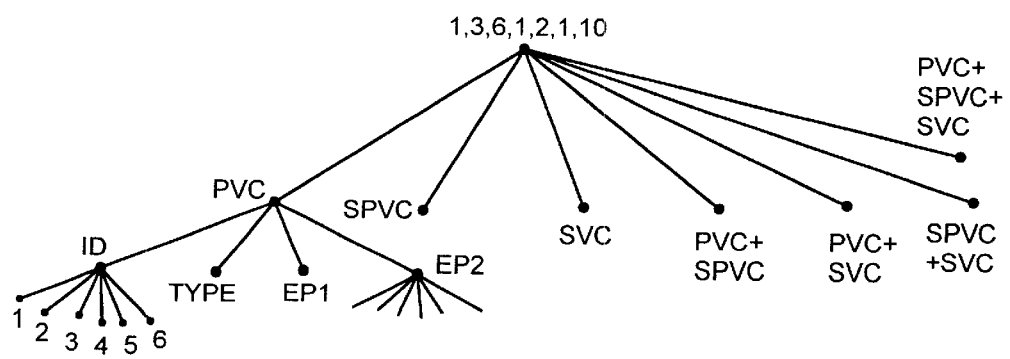

FIG. 2A illustrates a MIB tree for the above request without the <qualifier> specified. FIG. 2B illustrates the MIB tree in which an additional level is added to specify the various types or subclasses in the qualifier field.

According to this protocol the shortcomings of the first noted prior art solution are overcome because the ME does the filtering of objects from the table, before sending information to the NMS.

The shortcomings of the second noted prior art solution are overcome because the NMS can retrieve any single type or combination of types of data from a series, without having to use predetermined identifiers for each logical series.

Operation of the protocol in relation to getnext and getbulk requests, according to the invention, is illustrated in the following. FIG. 3 shows an example a table stored on the ME, namely the ATM switching system in FIG. 1, which table contains information about cross connections of various types. These include SVCC connections at ID 1 and ID 4, PVCC connections at ID 2 and ID 5 and SPVCC connections at ID 3 and ID 6. For this example an NMS using an efficient getnext or getbulk command as described for this invention could configure a bitmap field in the request protocol data unit (PDU) to contain three qualifier bits, one for each type of cross connection type. The protocol for accessing the cross connection table via an efficient getnext or getbulk command could define a bitmap field as follows to specify which endpoint types to retrieve: PVCC= 001, SPVCC =010, SVCC=100, PVCCs and SPVCCs=011, SPVCCs and SVCCs =110, PVCCs and SVCCs=101, and PVCCs and SPVCCs and SVCCs =111.

An NMS wishing to retrieve all SPVCC and SVCC connections could send a series of getnext commands as follows:

1. Request: command=getnext, tableName=connections, rowId=0, connectionTypes=110.
  Reply: ID=1, Type=SVCC, Endpoint 1 =A/1/1, Endpoint 2 =B/4/2
2. Request: command=getnext, tableName=connections, rowId=1, connectionTypes=110.
  Reply: ID=3, Type=SPVCC, Endpoint 1 =A/3/1, Endpoint 2 =C/4/0
3. Request: command=getnext, tableName=connections, rowId=3, connectionTypes=110.
  Reply: ID=4, Type=SVCC, Endpoint 1 =B/4/3, Endpoint 2 =C/18/0
4. Request: command=getnext, tableName=connections, rowId=4, connectionTypes=110.
  Reply: ID=6, Type=SVCC, Endpoint 1 =B/4/5, Endpoint 2 =C/15/0
5. Request: command=getnext, tableName=connections, rowId=6, connectionTypes=110.
  Reply: NIL (contains zero cross connection endpoints)

An NMS wishing to retrieve all SPVCC and SVCC connections could alternatively send a getbulk command as follows:

command=getbulk, tableName=connections, startingRowId=1, maxRowsToRetrieve=25, connectionTypes=110.

The table shown in FIG. 4 containing all of the SPVCC and SVCC connections would be returned to the NMS in response to the aforementioned getbulk command.

Figure 5:
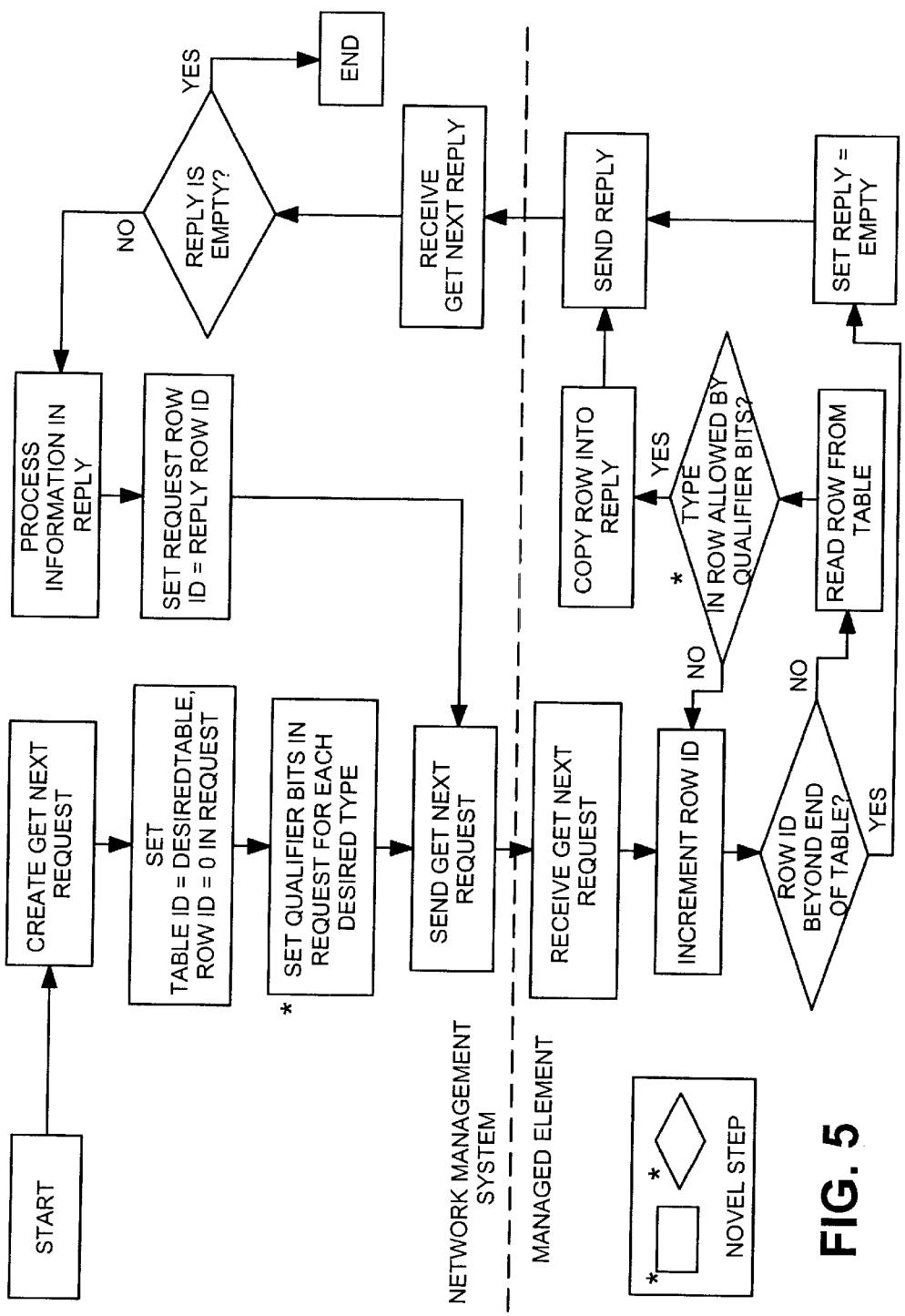
FIG. 5 is a flowchart illustrating the procedures followed by an NMS and ME in using an efficient getnext protocol to retrieve only selected types of rows from a table.

FIG. 5 is a flow diagram illustrating the procedures followed by a network management system and a managed element in using an efficient getnext protocol to retrieve only selected types of rows from a table. As shown in FIG. 5 the first step is to create a getnext request which is followed by the establishment of the table ID which is the name of the table under which the information is stored. Also, the row identification or row ID is set as given in the previously discussed getnext commands. Next, the qualifier bits respecting the desired subclass or type is set. In the previous example, this would be the connection types 110 signifying all SPVC and SVCC connections. The getnext request is then sent by the network management system to the managed element as indicated by the dotted line between network management system and managed element in FIG. 5. The getnext request is received by the managed element and the row ID is incremented as previously discussed. If the row ID is beyond the end of the table the request is forwarded back to the network management system and the set reply is indicated as being empty. If the row ID is not beyond the end of the table the new row is read from the table and the row is checked to see if it includes the type specified by the qualifier bits. If it is in the row, it is copied into the reply and forwarded to the network management system. If not, the row is incremented one additional row and rechecked. The response received by the network management system is checked to see if the reply indicates no additional information and if there is no additional information the process is ended. If, however, there is additional information the request is returned to the management element for further processing.

Figure 6:
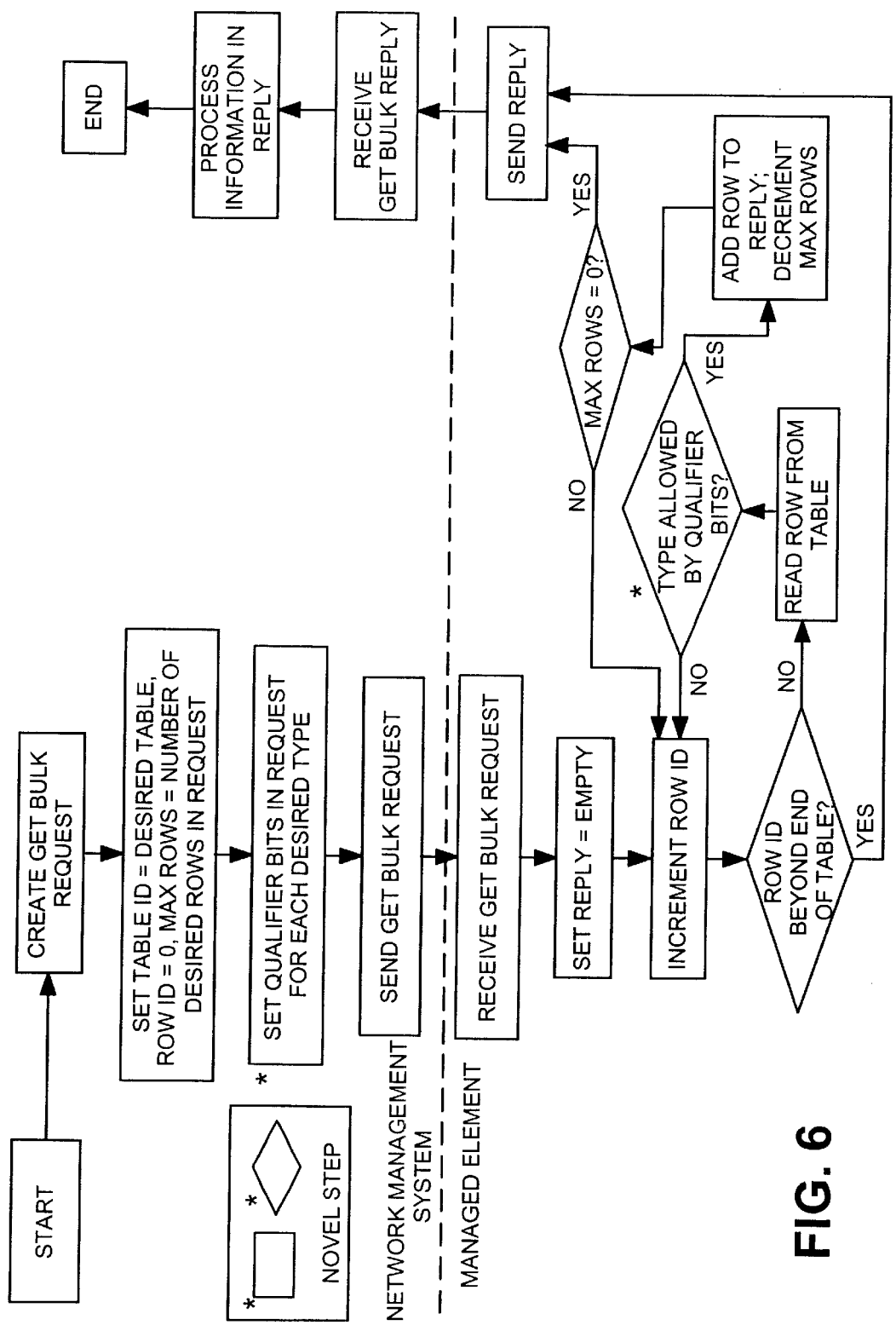
FIG. 6 is a flowchart illustrating the procedures followed by an NMS and ME in using an efficient getbulk protocol to retrieve only selected types of rows from a table.

FIG. 6 is a flowchart illustrating the procedures followed by a network management system and a managed element in using an efficient getbulk protocol to retrieve only selected types of rows from a table. Again, the process is started with the creation of the getbulk request and the table and row information is established including the number of desired rows to be covered in the request. The qualifier bits are set in the qualifier field as previously discussed. The network management system then sends the request to the managed element whereat the rows are examined and incremented in order to glean the requested information from the managed element. Upon completion the reply is returned to the network management system and the information is processed.

More qualifiers could be specified for a getnext or getbulk command retrieving cross connection information, for example another qualifier which specifies to retrieve either virtual channel circuit (VCC) cross connections or virtual path circuit (VPC) cross connections or both VCC and VPC cross connections.

Another example of objects belonging to a single class are networking interfaces. All of interfaces on an ME may be grouped together in a table according to their physical location within the ME, but for the purposes of accounting of for maintenance, the NMS may wish to retrieve information on groups of interfaces based on specific criteria such as their type, their configuration or their status.

The following is an example of an interface table for l interfaces (ports) on a managed element.

INTERFACE TABLE

| Row ID | Name | Type | Operational Status |
|--------|------|------|--------------------|
| 1 | A | OC3 | UP |
| 2 | B | DS3 | DOWN |
| 3 | C | T1 | DOWN |
| 4 | D | DS3 | UP |
| 5 | E | DS3 | DOWN |

BITS

QUALIFIER #1

| | |
|---|---|
| 01 | GET DOWN INTERFACES |
| 10 | GET UP INTERFACES |
| 11 | GET UP & DOWN |

QUALIFIER #2

| | |
|---|---|
| 001 | GET OC3 INTERFACES |
| 010 | GET DS3 INTERFACES |
| 100 | GET T1 INTERFACES |
| 011 | GET OC3 & DS3 INTERFACES |
| 101 | GET T1 & OC3 INTERFACES |
| 110 | GET T1 & DS3 INTERFACES |
| 111 | GET T1 & OC3 & DS3 INTERFACES |

QUAL #1 AND QUAL #2 MAY BE IN THE SAME BYTE

The following illustrates a getbulk command when it is desired to retrieve up to five operationally DOWN, DS3 interfaces in a managed element using the information contained in the above interface table.

GETBULK: TableId=Interface Table
  rowId=0
  Max Rows=5
  Status Qualifier=01
  Type Qualifier=010

The information returned from the getbulk command is given in the following table.

RETURNED TABLE

| Row ID | NAME | TYPE | STATUS |
|--------|------|------|--------|
| 2 | B | DS3 | DOWN |
| 5 | E | DS3 | DOWN |

This invention finds particular application in the management of communications networks. It can be used for NMS-to-ME, hierarchical NMS-to-NMS, and peer-level NMS-to-NMS communications.

Although a specific embodiment of the invention has been described and illustrated it will be apparent to one skilled in the art that numerous changes can be made to the basic concept. It is expected, however, that such changes will fall within the true scope of the invention as defined by the appended claims.

What is claimed is:

1. In a communications network management system in which items of information respecting a plurality of managed elements within the network are retained within said managed elements, an improved protocol for retrieving information from said managed elements comprising: adding to said items of information a qualifier bitmap in an object identifier, said qualifier bitmap having individual bits representing particular subclasses within a class of said information for filtering, at the managed elements, information to be returned from the managed elements to the network management system, whereby the managed elements each return only filtered information.

2. A protocol as defined in claim 1 wherein said managed element is a device in said communications network.

3. A protocol as defined in claim 2 wherein said information to be retrieved from said device includes a series of related data.

4. A protocol as defined in claim 3 wherein said series of related data is a table of information where each element of information is of the same class, but each element may also belong to a subclass of information, where all of the elements belonging to a particular subclass are not located contiguously in said table.

5. A protocol as defined in claim 4 wherein said qualifier bitmap is appended to a command issued by said network management system, and one or more bits of the bitmap may be set by giving it a designated value of 1 (one) or 0 (zero).

6. A protocol as defined in claim 5 wherein said one bit in said bitmap specifies one of said subclasses.

7. A protocol as defined in claim 5 wherein said command is a getnext command, whose reply should contain the next element of information in the specified table which belongs to a subclass whose corresponding bit is set in said qualifier bitmap.

8. A protocol as defined in claim 5 wherein said command is a getbulk command, whose reply should contain all of the elements in the specified table, up to the maximum desired number of elements, which belong to the subclasses whose corresponding bits are set in the qualifier bitmap.

9. The method as defined in claim 1 wherein a further qualifier is added to said items of information.

10. The method as defined in claim 9 wherein said further qualifier comprises a further qualifier bitmap.

11. The method as defined in claim 10 wherein said elements each comprise a switching system having a plurality of external communication interfaces connected thereto and one of the qualifier bitmaps represents particular external interfaces.

12. The method as defined in claim 10 wherein said elements each comprise a switching system having a plurality of external communication interfaces connected thereto, said interfaces being cross connected by virtual channel connections selected from the group consisting of switched virtual channel connections, permanent virtual channel connections, semi-permanent virtual channel connections and combinations thereof, and one of the qualifier bitmaps represents particular virtual channel connections.

13. In a management system for a communications network in which information objects respecting managed devices within the communications network are retained within said managed devices, and improved protocol for retrieving said information objects from said managed devices comprising: adding at least one non-SNMP qualifier to said information objects wherein said at least one qualifier comprises a qualifier bitmap having individual bits representing particular subclasses within a class of said information and providing filtering, at the managed devices, of the information to be returned from the managed devices to the network management system whereby the managed devices each return only filtered information to the management system.

14. A protocol as defined in claim 13 wherein said virtual channel connections are switched virtual channel connections (SVCCs), permanent virtual channel connections (PVCCs), semi-permanent virtual channel connections (SPVCCs) or combinations thereof.

15. A protocol as defined in claim 14 wherein said devices each comprise a switching system having a plurality of external communications interfaces connected thereto.

16. A protocol as defined in claim 15 wherein said communication interfaces are cross connected by virtual channel connections.

17. A protocol as defined in claim 16 wherein said qualifier bitmap specifies one of said communication interfaces.

18. A protocol as defined in claim 17 wherein said qualifier bitmap is appended to a command issued by said network management system, and one or more bits of said bitmap may be set by giving it a designated value of 1 (one) or 0 (zero).

19. A protocol as defined in claim 18 wherein said bitmap contains a bit word made up of a combination of ones and zeros.

20. A protocol as defined in claim 19 wherein said qualifier bitmap specifies one of said communication interfaces.

21. A protocol as defined in claim 19 wherein said qualifier bitmap specifies one of said virtual channel connections.

22. A protocol as defined in claim 19 wherein said qualifier bitmap specifies a combination of said virtual channel connections.

23. A method of retrieving items of information from a managed element in a communications network, the communications network having a network management system to generate a request for items of information and to forward the request to the managed element, the managed element responding to the request by returning items of information retrieved from a logical series of the information retained therein, the method comprising: adding a qualifier bitmap to the request, the qualifier bitmap having individual bits specifying particular subclasses of the logical series in which the items of information are retained and providing filtering, at the managed elements, of the information to be returned from the managed elements to the network management system whereby the managed elements each return only filtered information to the management system.

24. The method of claim 23 wherein the logical series of information is a table containing management information respecting the managed element.

25. A method of efficiently retrieving objects from a managed element in a communications network, the communications network having a network management system to generate requests for objects and to forward the requests to the managed element, the managed element responding to the requests by returning the objects to the network management system, the objects being retrieved from a single, logical series of objects retained in the managed element, the method comprising: adding at least two qualifiers to the requests, at least one of said qualifiers comprising a qualifier bitmap including individual bits representing particular subclasses of the logical series in which the objects are retained and providing filtering, at the managed elements, of the information to be returned from the managed elements to the network management system whereby the managed elements each return only filtered information to the management system.

26. The method as defined in claim 25 wherein the managed element is a switching node in an asynchronous transfer mode (ATM) network and said logical series of objects is a table containing switching information respecting said switching node.

27. The method as defined in claim 26 wherein the single logical series is a table setting out cross connect information respecting said switching node whereby one or more bits in specific bit positions in the bitmap specify information respecting said cross connects.

* * * * *